Dec. 31, 1940.　　　J. H. GRAY　　　2,227,220
EXPANSION TIRE WHEEL
Filed July 22, 1938　　　2 Sheets-Sheet 2
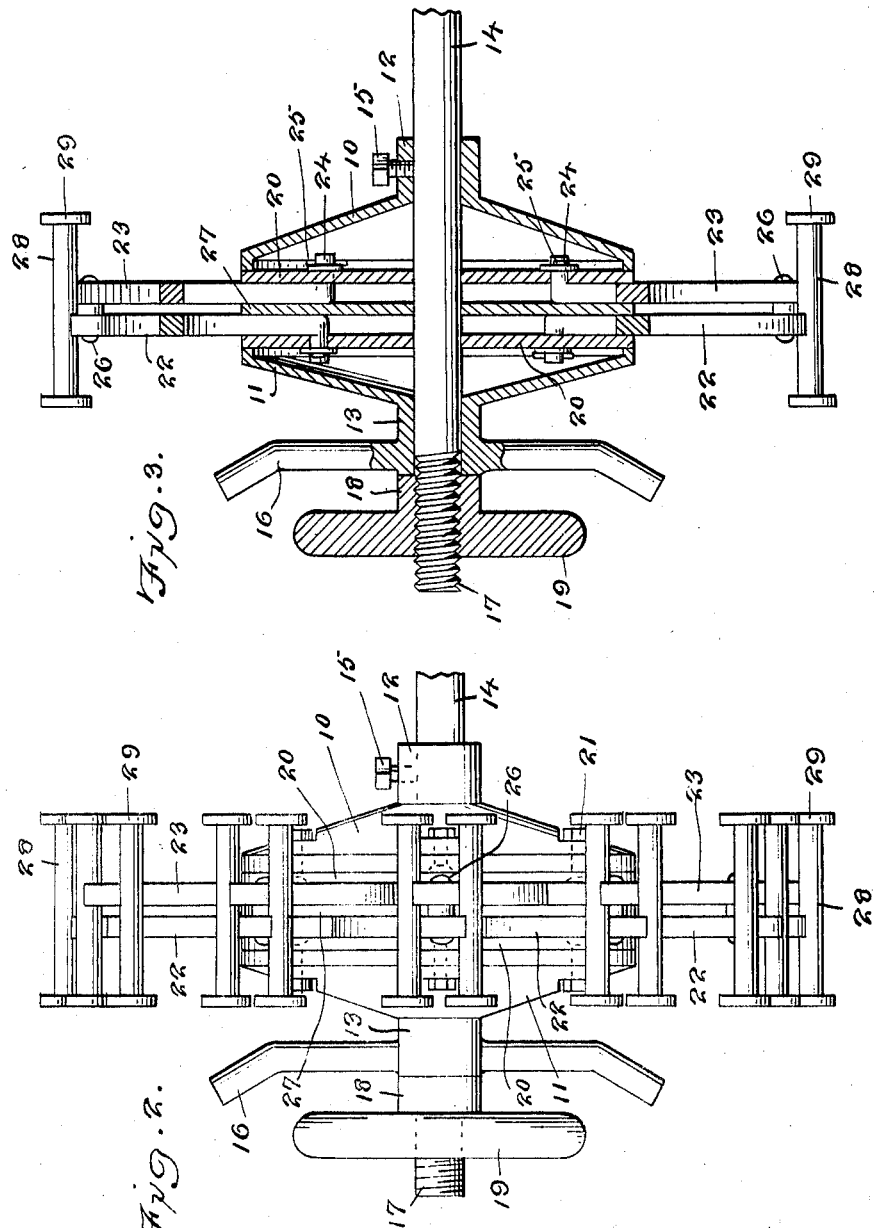
Joseph H. Gray
INVENTOR
BY Victor J. Evans & Co.
ATTORNEYS Patented Dec. 31, 1940

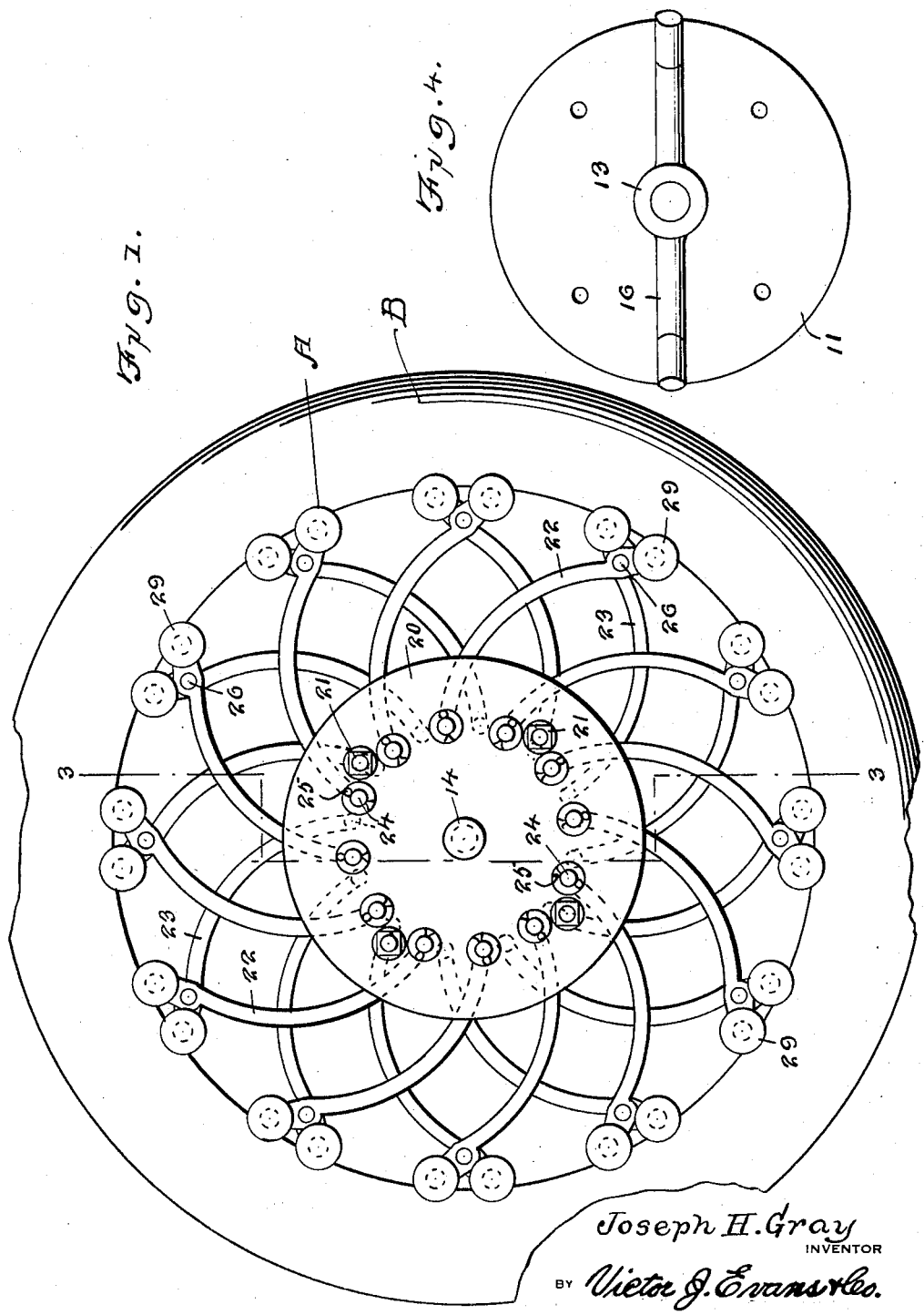

2,227,220

UNITED STATES PATENT OFFICE 2,227,220

EXPANSION TIRE WHEEL

Joseph H. Gray, St. Joseph, Mo.

Application July 22, 1938, Serial No. 220,749

5 Claims. (Cl. 154—9)

The invention relates to an expansion tire wheel and more especially to an expanding and contracting wheel for use on tire buffing machines.

The primary object of the invention is the provision of a wheel of this character, wherein different sizes of tires will be accommodated thereon so that such tire can be acted upon by a buffing machine, the wheel being susceptible of expansion and contraction to assure a tight fit of the tire thereon and also enables the mounting and demounting of the tire with dispatch.

Another object of the invention is the provision of a wheel of this character, wherein the spokes thereof are pivotally joined in pairs and through manipulation of a turning disk with which these spokes are pivoted concentrically thereof the diameter of the wheel can be changed to vary the said wheel in its size for the mounting of different sizes of tires thereon and also for the holding of the tire thereon for subjecting it to a buffing operation at the tread and on opposite sides of its tread, the buffing being for retreading, recapping and top capping of the tire.

A further object of the invention is the provision of a wheel of this character, wherein the construction thereof is novel in its entirety and is susceptible of easy and quick adjustment for varying the size so that the wheel can be fitted with a tire and the latter held secure thereon and in this way eliminating the necessity for the use of different sized rims for the mounting of tires of different sizes when placed within a buffing machine for buffing operation.

A still further object of the invention is the provision of a wheel of this character, which is comparatively simple in its construction, thoroughly reliable and efficient in operation, susceptible of quick and easy adjustment, strong, and inexpensive to manufacture and install in a buffing machine.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 1 is a fragmentary side elevation of a wheel constructed in accordance with the invention.

Figure 2 is an edge view thereof.

Figure 3 is a sectional view on the line 3—3 of Figure 1.

Figure 4 is a detail plan view of the adjusting disk employed in the wheel make-up.

Similar reference characters indicate corresponding parts throughout the several views in the drawings.

Referring to the drawings in detail, A designates generally a wheel of the expanding and contracting type constructed in accordance with the invention and comprises a pair of opposed concavo convexed disks 10 and 11, respectively, these being formed with center hubs 12 and 13 for accommodating an axle or spindle 14 rotatably supported. The hub 12 has fitted therein a set screw 15 so that it can be made fast to the axle or spindle 14. The hub 13 has formed thereon a pair of handle bars 16, these being diametrically opposite each other and are extended laterally and slightly outwardly curved with respect to the disk 11. The handle bars 16 serve for the manual adjustment of the disk 11 which is freely turnable on the axle or spindle 14.

The axle or spindle 14 is provided with a threaded end 17 on which is engaged a binding nut 18 having a turn wheel 19 and this nut 18 is engageable with the hub 13 to effect a stop for movement of the disk 11 in one direction longitudinally on the axle or spindle 14.

The disks 10 and 11 carry at their confronting sides face plates 20 which are bolted or otherwise secured to companion disks 10 and 11 as at 21, the plates 20 being provided with center apertures for the axle or spindle 14 and are in the form of flat disks of diameters corresponding to the diameters of the disks 10 and 11.

Pivoted concentrically to the plates 20 circumferentially thereof are series of curved arms 22 and 23, respectively, the curvatures of the series of arms 22 being reverse to the curvatures of the series of arms 23. These arms 22 and 23 have pivot crank terminals 24 which are engaged in the plates 20 and are held swingable by cotter pins 25 engaged in said terminals. The arms 22 are disposed in crossed relation to the arms 23 and at the crossing points are pivoted together at 26 so that said arms in their series have scissor-like operation and this scissor-like action is effected on the turning of the disk 11 upon the axle or spindle 14.

The arms 22 and 23 are suitably spaced or separated through the medium of a disk or plate 27 interposed between the series of arms 22 and 23. This plate or disk 27 is provided with a suitable center opening receiving the axle or spindle 14.

The arms 22 and 23 outwardly of the pivots 26 are formed with roller-like cross heads 28 having capped ends 29 and upon these roller-like heads is seated a tire casing for the holding of the tire upon the wheel which latter is usable in a buffing machine for the buffing operation upon the tire.

To expand or contract the wheel at the cross heads 28, it is necessary through use of the handle 16 to turn the disk 11 and thereby imparting scissor-like action to the arms 22 and 23 in their crossed pivotal relation to each other. In this manner the heads 28 are moved inwardly toward the center of the wheel or outwardly away from the same. It must be apparent from the foregoing and the disclosure in the drawings that the wheel is susceptible of expansion and contraction for its adjustment to varying sizes of tires of the motor vehicle kind, a portion of a tire being indicated at B in Figure 1 of the drawings.

The plate or disk 27 functions as a spacer element for the series of arms 22 and 23 being intermediate thereof.

When the disk 11 has been turned and the cross heads 28 adjusted to the required degree, the nut 18 holds the said disk 11 and also the coaction between the plates 20 and 27 assures a clamping of the series of arms 22 and 23 therebetween and thus locking the wheel in its extended or contracted condition.

What is claimed is:

1. An expanding and contracting device of the kind described comprising opposed concavo-convex disks movable in matched relation to each other toward and away from one another, one of the disks being fixed against rotation and the other disk rotatably supported, extensible and retractable arms arranged between the said disks and operated upon for the extension and retraction thereof on rotation of one disk relative to the other, a grip associated with the rotatable disk for the turning thereof, means for moving the rotatable disk toward the other disk and the locking thereof in an adjusted position, and seating heads on said arms.

2. An expanding and contracting device of the kind described comprising opposed concavo-convex disks movable in matched relation to each other toward and away from one another, one of the disks being fixed against rotation and the other disk rotatably supported, extensible and retractable arms arranged between the said disks and operated upon for the extension and retraction thereof on rotation of one disk relative to the other, a grip associated with the rotatable disk for the turning thereof, means for moving the rotatable disk toward the other disk and the locking thereof in an adjusted position, seating heads on said arms, and an axle having the said disks thereon and adjustably supporting the last-named means.

3. An expanding and contracting device of the kind described comprising opposed concavo-convex disks movable in matched relation to each other toward and away from one another, one of the disks being fixed against rotation and the other disk rotatably supported, extensible and retractable arms arranged between the said disks and operated upon for the extension and retraction thereof on rotation of one disk relative to the other, a grip associated with the rotatable disk for the turning thereof, means for moving the rotatable disk toward the other disk and the locking thereof in an adjusted position, seating heads on said arms, an axle having the said disks thereon and adjustably supporting the last-named means, and hubs formed on the said disks for the said axle.

4. An expanding and contracting device of the kind described comprising opposed concavo-convex disks movable in matched relation to each other toward and away from one another, one of the disks being fixed against rotation and the other disk rotatably supported, extensible and retractable arms arranged between the said disks and operated upon for the extension and retraction thereof on rotation of one disk relative to the other, a grip associated with the rotatable disk for the turning thereof, means for moving the rotatable disk toward the other disk and the locking thereof in an adjusted position, seating heads on said arms, an axle having the said disks thereon and adjustably supporting the last-named means, hubs formed on the said disks for the said axle, and a plate arranged between the disks and interfitted with the said arms.

5. An expanding and contracting device of the kind described comprising opposed concavo-convex disks movable in matched relation to each other toward and away from one another, one of the disks being fixed against rotation and the other disk rotatably supported, extensible and retractable arms arranged between the said disks and operated upon for the extension and retraction thereof on rotation of one disk relative to the other, a grip associated with the rotatable disk for the turning thereof, means for moving the rotatable disk toward the other disk and the locking thereof in an adjusted position, seating heads on said arms, an axle having the said disks thereon and adjustably supporting the last-named means, hubs formed on the said disks for the said axle, and a plate arranged between the disks and interfitted with the said arms, the said plate being loose on said axle and effective for following action on the movement of the rotatable disk toward the other disk.

JOSEPH H. GRAY.